US011524694B2

(12) United States Patent
Ibuka et al.

(10) Patent No.: US 11,524,694 B2
(45) Date of Patent: Dec. 13, 2022

(54) VEHICLE CONTROL APPARATUS, VEHICLE, VEHICLE CONTROL METHOD, AND NON-TRANSITORY COMPUTER-READABLE STORAGE MEDIUM

(71) Applicant: HONDA MOTOR CO., LTD., Tokyo (JP)

(72) Inventors: Jun Ibuka, Wako (JP); Akira Shiogai, Tokyo (JP); Jun Ochida, Wako (JP); Kouhei Miyamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/155,186

(22) Filed: Jan. 22, 2021

(65) Prior Publication Data

US 2021/0229685 A1 Jul. 29, 2021

(30) Foreign Application Priority Data

Jan. 29, 2020 (JP) .............................. JP2020-012809

(51) Int. Cl.
*B60W 60/00* (2020.01)
*B60W 50/029* (2012.01)
(Continued)

(52) U.S. Cl.
CPC ....... *B60W 50/029* (2013.01); *B60R 16/0232* (2013.01); *B60W 60/0053* (2020.02); *G05D 1/0061* (2013.01)

(58) Field of Classification Search
CPC .......... B60W 50/029; B60W 60/0053; B60W 2420/42; B60W 2420/52; B60W 10/18;
(Continued)

(56) References Cited

U.S. PATENT DOCUMENTS 7,349,770 B2   3/2008  Matsuzaki et al.
7,828,112 B2 * 11/2010  Kezobo ................ B62D 5/0481
                                                      180/443
(Continued)

FOREIGN PATENT DOCUMENTS

CN    105253076 A    1/2016
CN    110001617 A    7/2019
(Continued)

OTHER PUBLICATIONS

Chinese Office Action for Chinese Patent Application No. 202110052405.X dated Dec. 31, 2021 (partially translated).
(Continued)

*Primary Examiner* — Donald J Wallace
*Assistant Examiner* — Daniel M. Robert
(74) *Attorney, Agent, or Firm* — Thomas | Horstemeyer, LLP

(57) ABSTRACT

A vehicle control apparatus that comprises a first control unit and a second control unit each configured to perform travel control of a vehicle, a first communication line configured to connect the first control unit and the second control unit, a second communication line configured to connect the first control unit and an operation unit configured to operate based on a control signal transmitted from one of the first control unit and the second control unit, and a third communication line configured to connect the operation unit and the second control unit. The vehicle control apparatus further comprises a fourth communication line configured to connect the first control unit and the operation unit.

12 Claims, 7 Drawing Sheets

(51) Int. Cl.
*G05D 1/00* (2006.01)
*B60R 16/023* (2006.01)

(58) Field of Classification Search
CPC .......... B60W 10/20; B60W 30/18163; B60W 50/02; B60W 10/06; B60W 40/02; B60R 16/0232; G05D 1/0061
See application file for complete search history.

(56) References Cited

U.S. PATENT DOCUMENTS

| | | | |
|---|---|---|---|
| 9,604,585 B2 | 3/2017 | Joyce et al. | |
| 9,818,241 B2* | 11/2017 | Murakami | G07C 5/0808 |
| 10,139,828 B2* | 11/2018 | Ho | B60W 30/00 |
| 11,009,872 B2 | 5/2021 | Ishikawa et al. | |
| 11,148,677 B2 | 10/2021 | Mukai et al. | |
| 2006/0271260 A1 | 11/2006 | Matsuzaki et al. | |
| 2014/0303827 A1* | 10/2014 | Dolgov | B60W 60/0054 701/23 |
| 2016/0009235 A1 | 1/2016 | Joyce et al. | |
| 2018/0299898 A1* | 10/2018 | Luo | G05D 1/0061 |
| 2018/0326992 A1* | 11/2018 | Aoi | G06V 20/597 |
| 2018/0373244 A1* | 12/2018 | Augst | B60W 30/10 |
| 2019/0155279 A1* | 5/2019 | Tayama | B60W 50/14 |
| 2019/0204828 A1 | 7/2019 | Ishikawa et al. | |
| 2019/0324450 A1* | 10/2019 | Lurie | H04L 9/3247 |
| 2019/0359207 A1* | 11/2019 | Ochida | G08G 1/04 |
| 2019/0382009 A1 | 12/2019 | Iwasa | |
| 2020/0159212 A1* | 5/2020 | Kuwabara | B60W 60/0053 |
| 2020/0298871 A1 | 9/2020 | Mukai et al. | |
| 2020/0363818 A1* | 11/2020 | Li | B60W 30/0956 |
| 2020/0391790 A1* | 12/2020 | Kamemura | B62D 15/025 |

FOREIGN PATENT DOCUMENTS

| | | | | |
|---|---|---|---|---|
| CN | 110191833 A | | 8/2019 | |
| CN | 110325423 A | | 10/2019 | |
| EP | 3210853 A1 | * | 8/2017 | ............... B62D 1/28 |
| JP | 4923785 B2 | * | 4/2012 | |
| JP | 2019-189021 A | | 10/2019 | |
| WO | WO-2018154862 A1 | * | 8/2018 | ............ B60W 10/04 |
| WO | 2019/116459 A1 | | 6/2019 | |
| WO | 2019/116870 A1 | | 6/2019 | |

OTHER PUBLICATIONS

Japanese Notice of Grant for Japanese Patent Application No. 2020-012809 dated Nov. 8, 2021 (partially translated).

* cited by examiner

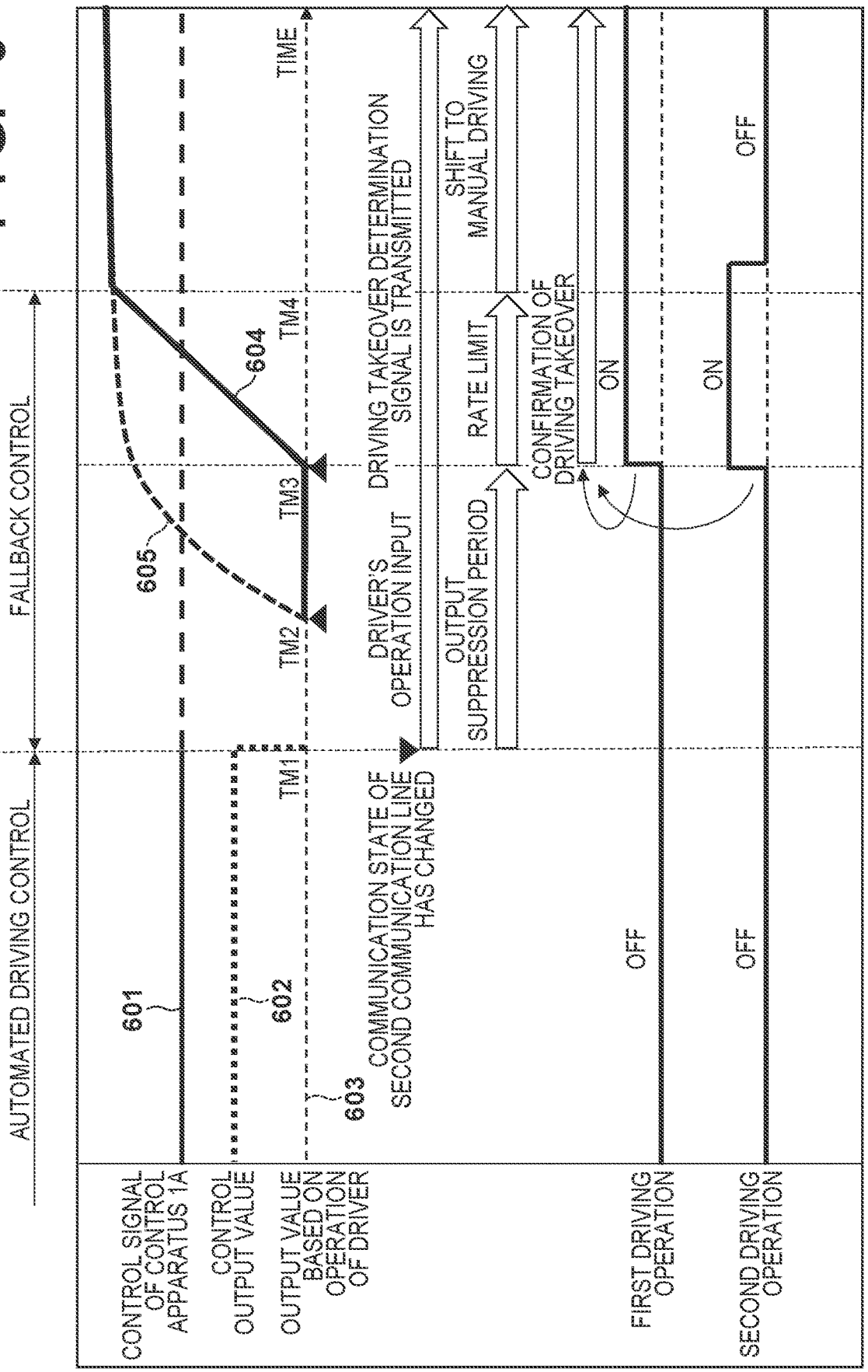

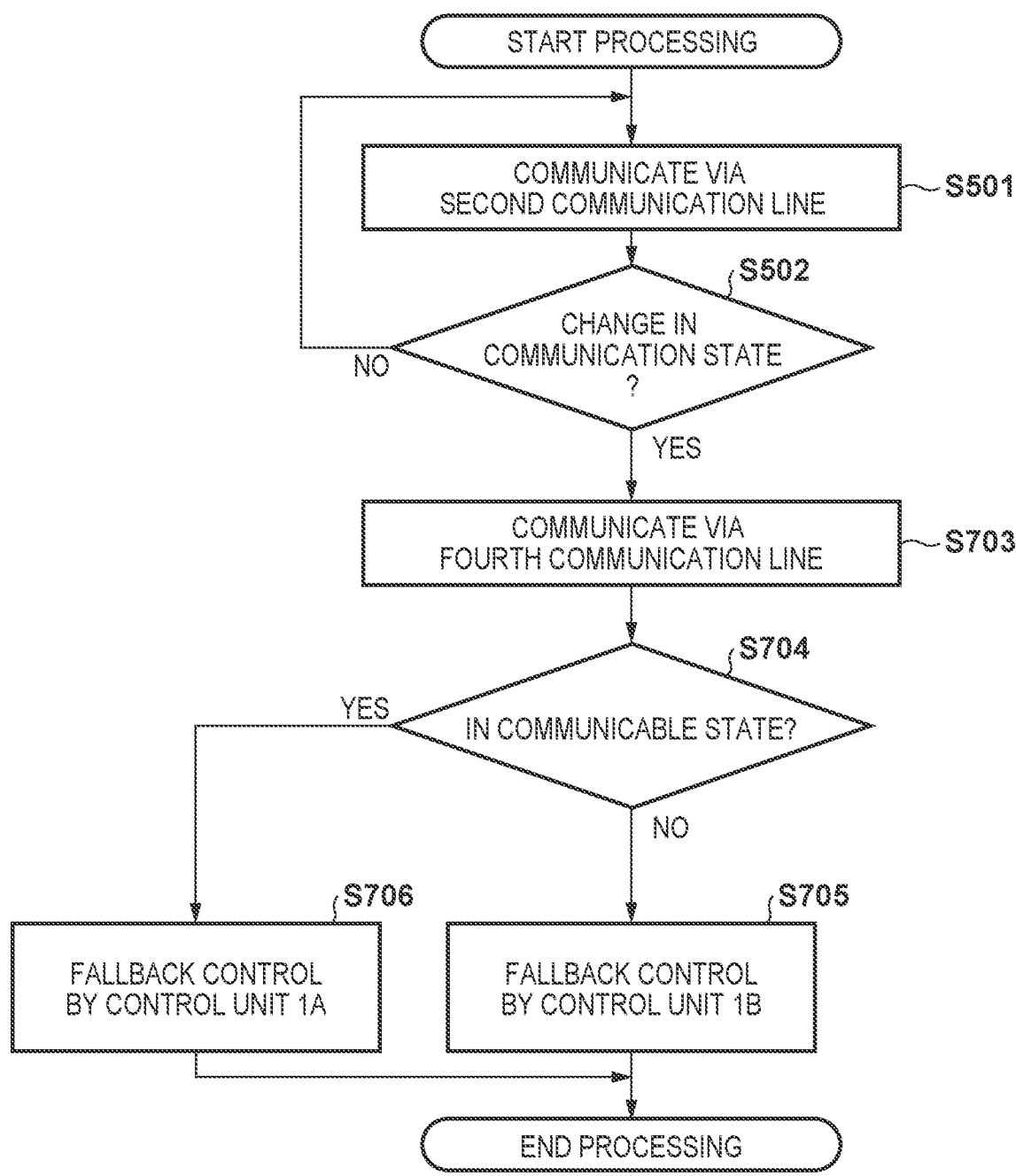

VEHICLE CONTROL APPARATUS, VEHICLE, VEHICLE CONTROL METHOD, AND NON-TRANSITORY COMPUTER-READABLE STORAGE MEDIUM

CROSS-REFERENCE TO RELATED APPLICATION(S)

This application claims priority to and the benefit of Japanese Patent Application No. 2020-012809 filed on Jan. 29, 2020, the entire disclosure of which is incorporated herein by reference.

BACKGROUND OF THE INVENTION

Field of the Invention

The present invention relates to a vehicle control apparatus, a vehicle, a vehicle control method, and a non-transitory computer-readable storage medium, and more specifically to a vehicle control technique for an automated driving vehicle.

Description of the Related Art

International Publication No. 2019/116870 discloses an automated driving control apparatus that includes a main ECU and a sub-ECU. In the automated driving control apparatus disclosed in International Publication No. 2019/116870, in a case in which the communication state between the main ECU and an operation unit (actuator) which operates based on a control signal transmitted from the main ECU has changed, the main subject of vehicle control will be switched from the main ECU to the sub-ECU, and the sub-ECU will execute fallback control that restricts a travel control function of a vehicle.

However, if a time lag occurs in communication when the main subject of travel control is to be switched from the main ECU to the sub-ECU, fallback control may not be able to be executed smoothly.

In consideration of the above problem, the present invention provides a vehicle control technique that can perform fallback control without switching the main subject of travel control of a vehicle.

SUMMARY OF THE INVENTION

According to one aspect of the present invention, there is provided a vehicle control apparatus that comprising: a first control unit and a second control unit each configured to perform travel control of a vehicle; a first communication line configured to connect the first control unit and the second control unit; a second communication line configured to connect the first control unit and an operation unit configured to operate based on a control signal transmitted from one of the first control unit and the second control unit; and a third communication line configured to connect the operation unit and the second control unit. The vehicle control apparatus further comprises a fourth communication line configured to connect the first control unit and the operation unit.

According to the present invention, fallback control can be performed without switching the main subject of travel control of a vehicle.

BRIEF DESCRIPTION OF THE DRAWINGS

The accompanying drawings, which are incorporated in and constitute a part of the specification, illustrate embodiments of the invention and, together with the description, serve to explain the present invention.

FIG. 6 is a timing chart for explaining the processing of the vehicle control apparatus according to the embodiment; and FIG. 7 is a flowchart for explaining the procedure of processing according to the embodiment.

DESCRIPTION OF THE EMBODIMENTS

Figure 1:
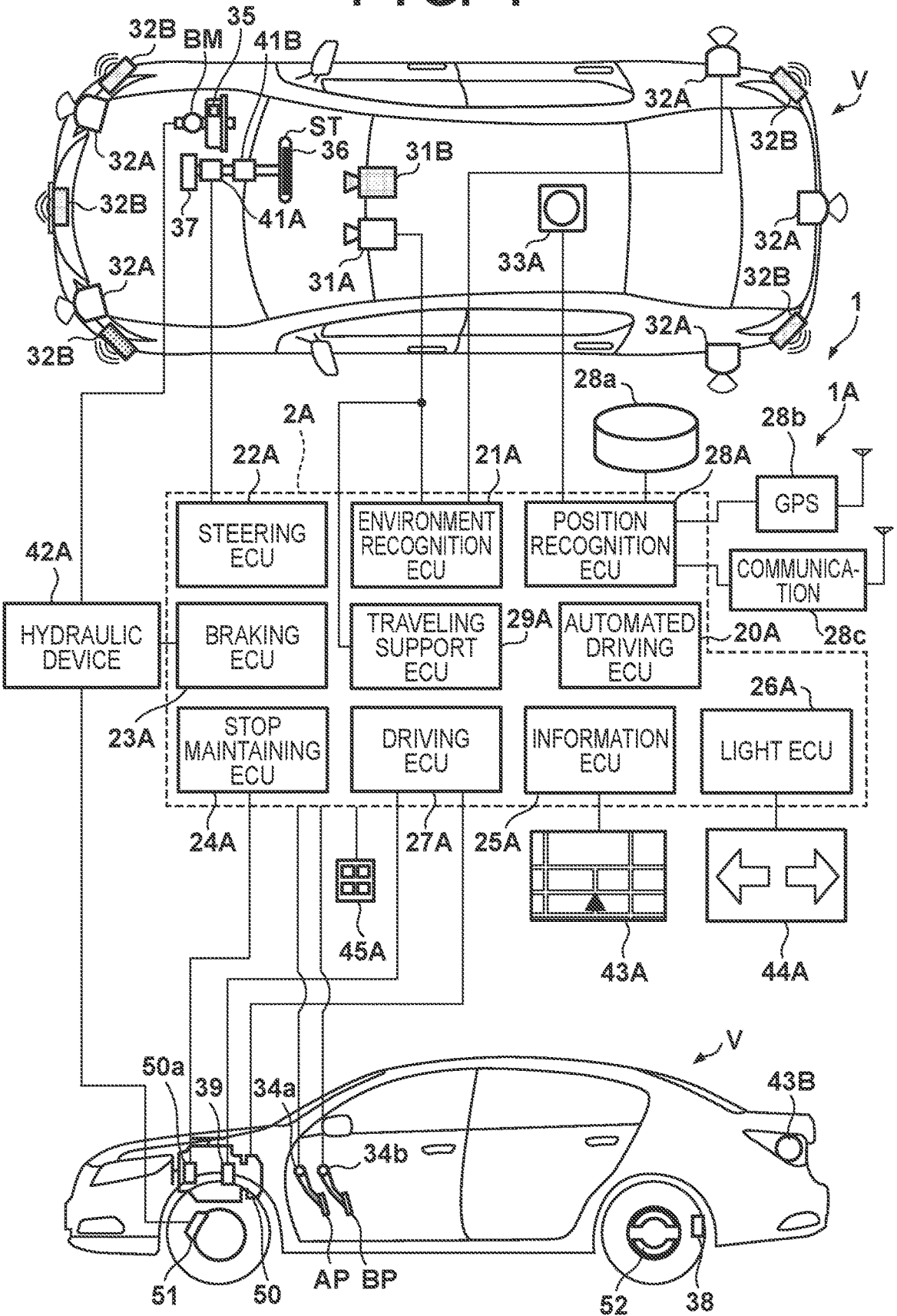
FIG. 1 is a block diagram of a vehicle control apparatus according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 2:
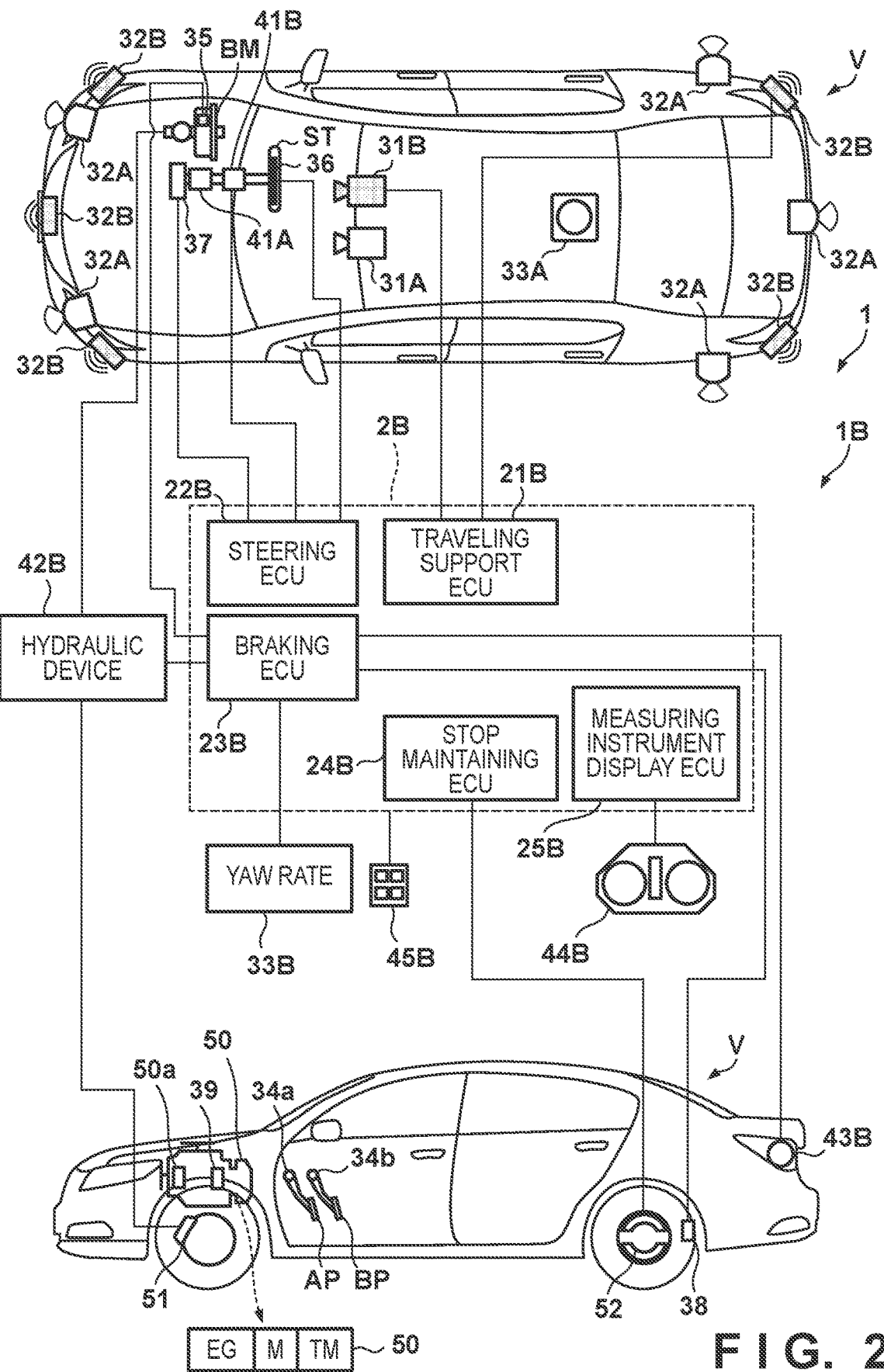
FIG. 2 is a block diagram of the vehicle control apparatus according to the embodiment.
Figure 3:
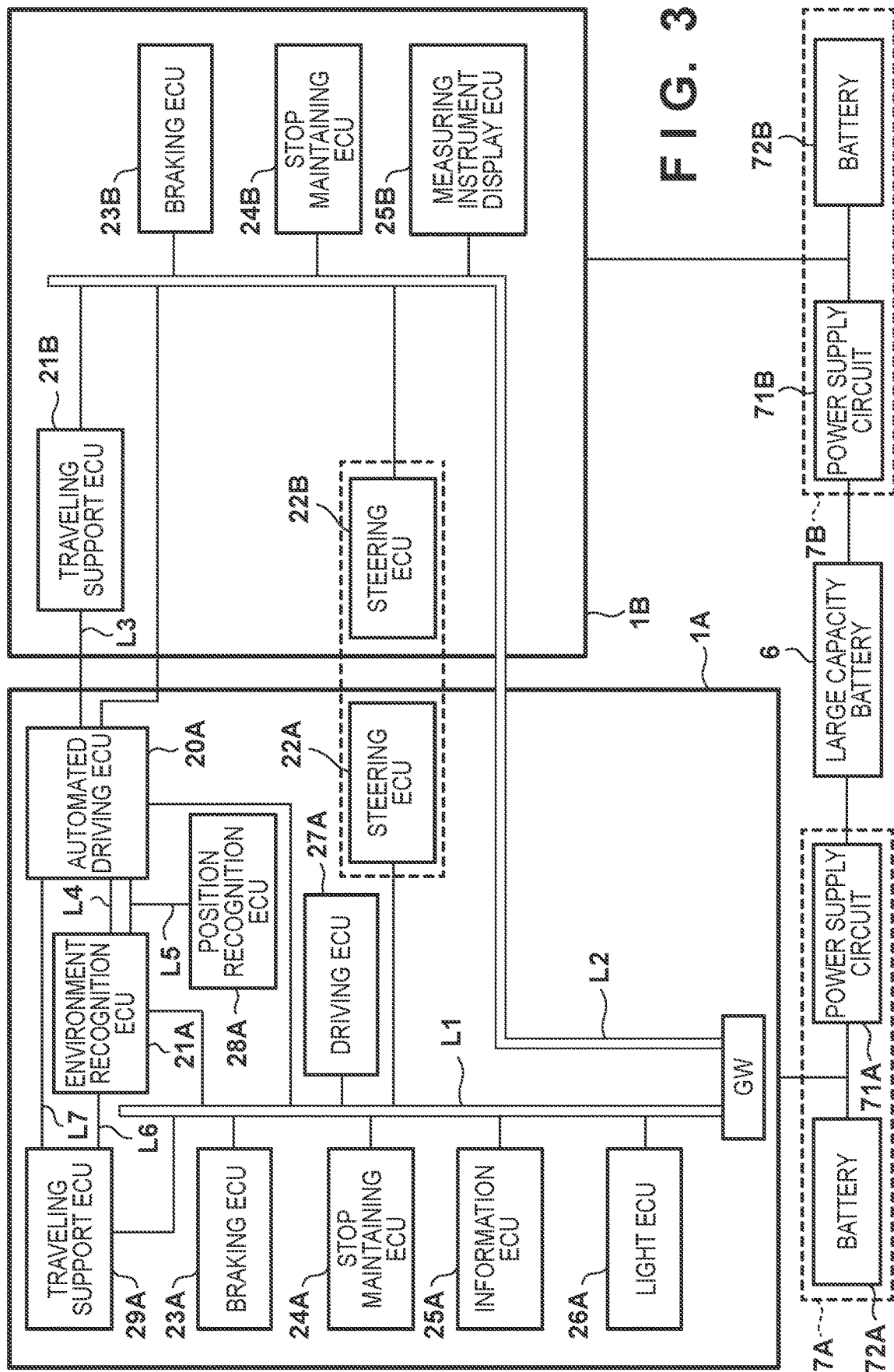
FIG. 3 is a block diagram of the vehicle control apparatus according to the embodiment.

FIGS. 1 to 4 are block diagrams of a vehicle control apparatus 1 according to an embodiment of the present invention. The vehicle control apparatus 1 controls a vehicle V. In each of FIGS. 1 and 2, an outline of the vehicle V is shown in a plan view and a side view. As an example, the vehicle V is a sedan-type four-wheeled vehicle. The vehicle control apparatus 1 includes a control apparatus 1A and a control apparatus 1B. FIG. 1 is a block diagram showing the control apparatus 1A, and FIG. 2 is a block diagram showing the control apparatus 1B. FIG. 3 mainly shows the arrangement of communication lines between the control apparatus 1A and the control apparatus 1B and power supplies.

The control apparatus 1A and the control apparatus 1B make some functions implemented by the vehicle V multiplexed or redundant. This can improve the reliability of the vehicle control apparatus. The control apparatus 1A performs, for example, not only automated driving control and normal operation control in manual driving but also travel support control concerning emergency avoidance and the like. The control apparatus 1B mainly performs travel support control concerning emergency avoidance and the like. Travel support will be sometimes referred to as driving support. The control apparatus 1A and the control apparatus 1B are caused to perform different control processes while making the functions redundant, thereby improving the reliability while distributing the control processes.

The vehicle V according to this embodiment is a parallel hybrid vehicle. FIG. 2 schematically shows the arrangement of a power plant 50 that outputs a driving force to rotate the driving wheels of the vehicle V. The power plant 50 includes an internal combustion engine EG, a motor M, and an automatic transmission TM. The motor M is usable as a driving source to accelerate the vehicle V and is also usable as a power generator upon deceleration or the like (regenerative braking).

<Control Apparatus 1A>

The arrangement of the control apparatus 1A will be described with reference to FIG. 1. The control apparatus 1A functions as a first control apparatus that performs travel control of the vehicle V. The control apparatus 1A includes an ECU group (control unit group) 2A. The ECU group 2A includes a plurality of ECUs 20A to 29A. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 1 and 3, the names of the representative functions of the ECUs 20A to 29A are given. For example, the ECU 20A is denoted by "automated driving ECU".

The ECU 20A executes control associated with automated driving as travel control of the vehicle V. In automated driving, at least one of driving (acceleration of the vehicle V by the power plant 50, and the like), steering, and braking of the vehicle V is automatically performed independently of the driving operation of the driver. In this embodiment, driving, steering, and braking are automatically performed.

The ECU 21A is an environment recognition unit configured to recognize the travel environment of the vehicle V based on the detection results of detection units 31A and 32A that detect the peripheral situation of the vehicle V. The ECU 21A generates target data (to be described later) as peripheral environment information.

In this embodiment, the detection unit 31A is an image capturing device (to be sometimes referred to as the camera 31A hereinafter) configured to detect an object around the vehicle V by image capturing. The camera 31A is provided at the roof front portion in the vehicle V to capture the front side of the vehicle V. When images captured by the camera 31A are analyzed, the contour of a target or a division line (a white line or the like) of a lane on a road can be extracted.

In this embodiment, the detection unit 32A is a LiDAR (Light Detection and Ranging) (to be sometimes referred to as the LiDAR 32A hereinafter) configured to detect an object around the vehicle V by light, and detects a target around the vehicle V or measures the distance to a target. In this embodiment, five LiDARs 32A are provided; one at each corner of the front portion of the vehicle V, one at the center of the rear portion, and one on each side of the rear portion. The number of LiDARs 32A and their arrangement can appropriately be selected.

The ECU 29A is a travel support unit configured to execute control associated with travel support (in other words, driving support) as travel control of the vehicle V based on the detection result of the detection unit 31A.

The ECU 22A is a steering control unit configured to control an electric power steering device 41A (to be also simply referred to as a "steering device"). The electric power steering device 41A includes a mechanism that steers the front wheels in accordance with the driving operation (steering operation) of the driver on a steering wheel ST. The electric power steering device 41A includes a motor that generates a driving force to assist the steering operation or automatically steer the front wheels, a sensor that detects the rotation amount of the motor, a torque sensor that detects the steering torque on the driver, and the like.

The ECU 23A is a braking control unit configured to control a hydraulic device 42A. The hydraulic device 42A implements, for example, an ESB (Electric Servo Brake). A braking operation of the driver on a brake pedal BP is converted into a fluid pressure by a brake master cylinder BM and transmitted to the hydraulic device 42A. The hydraulic device 42A is an actuator capable of controlling, based on the fluid pressure transmitted from the brake master cylinder BM, the fluid pressure of hydraulic oil to be supplied to a brake device (for example, a disc brake device) 51 provided in each of the four wheels. The ECU 23A performs driving control of a solenoid valve and the like provided in the hydraulic device 42A. In this embodiment, the ECU 23A and the hydraulic device 42A form an electric servo brake. The ECU 23A controls, for example, the distribution of a braking force by the four brake devices 51 and a braking force by regenerative braking of the motor M. A wheel speed sensor 38 provided in each of the four wheels is electrically connected to the ECU 23A, and the distribution of the braking force can be controlled based on the detection results of these sensors.

The ECU 24A is a stop maintaining control unit configured to control an electric parking lock device 50a provided in the automatic transmission TM. The electric parking lock device 50a includes a mechanism that locks the internal mechanism of the automatic transmission TM mainly when the P range (Park range) is selected. The ECU 24A can control lock and unlock by the electric parking lock device 50a.

The ECU 25A is an in-vehicle notification control unit configured to control an information output device 43A for performing information notification to occupants in the vehicle. The information output device 43A includes, for example, a display device such as a head-up display and a sound output device. The information output device 43A may further include a vibration device. The ECU 25A causes the information output device 43A to output, for example, various kinds of information such as a vehicle speed and an atmospheric temperature and information such as a path guidance.

The ECU 26A is an external notification control unit configured to control an information output device 44A that performs information notification to the outside of the vehicle. In this embodiment, the information output device 44A is a direction indicator (hazard lamp). The ECU 26A controls blinking of the information output device 44A serving as a direction indicator, thereby notifying the outside of the vehicle of the advancing direction of the vehicle V. In addition, the ECU 26A controls blinking of the information output device 44A serving as a hazard lamp to increase the attention of the outside to the vehicle V.

The ECU 27A is a driving control unit configured to control the power plant 50. In this embodiment, one ECU 27A is assigned to the power plant 50. However, one ECU may be assigned to each of the internal combustion engine EG, the motor M, and the automatic transmission TM. The ECU 27A controls the output of the internal combustion engine EG or the motor M or switches the gear range of the automatic transmission TM in correspondence with, for example, the driving operation of the driver detected by an operation detection sensor 34a provided on an accelerator pedal AP or an operation detection sensor 34b provided on the brake pedal BP, the vehicle speed, or the like. Note that as a sensor that detects the travel state of the vehicle V, a rotation speed sensor 39 that detects the rotation speed of the output shaft of the automatic transmission TM is provided in the automatic transmission TM. The vehicle speed of the vehicle V can be calculated from the detection result of the rotation speed sensor 39.

The ECU 28A is a position recognition unit configured to recognize the current position or the route of the vehicle V. The ECU 28A performs control of a gyro sensor 33A, a GPS sensor 28b, and a communication device 28c and information processing of a detection result or a communication result. The gyro sensor 33A detects the rotary motion of the vehicle V. The route of the vehicle V can be determined based on the detection result of the gyro sensor 33A, and the like. The GPS sensor 28b detects the current position of the vehicle V. The communication device 28c performs wireless communication with a server configured to provide map information and traffic information, and acquires these pieces of information. A database 28a can store accurate map information. The ECU 28A can more accurately specify the position of the vehicle V on a lane based on the map information and the like.

An input device 45A is arranged in the vehicle so as to be operable by the driver, and accepts input of an instruction or information from the driver.

<Control Apparatus 1B>

The arrangement of the control apparatus 1B will be described with reference to FIG. 2. The control apparatus 1B functions as a second control apparatus that performs travel control of the vehicle V. The control apparatus 1B includes an ECU group (control unit group) 2B. The ECU group 2B includes a plurality of ECUs 21B to 25B. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 2 and 3, the names of the representative functions of the ECUs 21B to 25B are given, like the ECU group 2A.

The ECU 21B is an environment recognition unit configured to recognize the travel environment of the vehicle V based on the detection results of detection units 31B and 32B that detect the peripheral situation of the vehicle V, and also serves as a travel support unit configured to execute control associated with travel support (in other words, driving support) as travel control of the vehicle V. The ECU 21B generates target data (to be described later) as peripheral environment information.

Note that in this embodiment, the ECU 21B has the environment recognition function and the travel support function. However, an ECU may be provided for each function, like the ECU 21A and the ECU 29A of the control apparatus 1A. Conversely, in the control apparatus 1A, the functions of the ECU 21A and the ECU 29A may be implemented by one ECU, like the ECU 21B.

In this embodiment, the detection unit 31B is an image capturing device (to be sometimes referred to as the camera 31B hereinafter) configured to detect an object around the vehicle V by image capturing. The camera 31B is provided at the roof front portion in the vehicle V to capture the front side of the vehicle V. When images captured by the camera 31B are analyzed, the contour of a target or a division line (a white line or the like) of a lane on a road can be extracted. In this embodiment, the detection unit 32B is a millimeter wave radar (to be sometimes referred to as the radar 32B hereinafter) configured to detect an object around the vehicle V by a radio wave, and detects a target around the vehicle V or measures the distance to a target. In this embodiment, five radars 32B are provided; one at the center of the front portion of the vehicle V, one at each corner of the front portion, and one at each corner of the rear portion. The number of radars 32B and their arrangement can appropriately be selected.

The ECU 22B is a steering control unit configured to control the electric power steering device 41B (to be also simply referred to as a "steering device" hereinafter). The electric power steering device 41B includes a mechanism that steers the front wheels in accordance with the driving operation (steering operation) of the driver on the steering wheel ST. The electric power steering device 41B includes a motor that generates a driving force to assist the steering operation or automatically steer the front wheels, a sensor that detects the rotation amount of the motor, a torque sensor that detects the steering torque on the driver, and the like. In addition, a steering angle sensor 37 is electrically connected to the ECU 22B via a communication line L2 (to be described later), and the electric power steering device 41B can be controlled based on the detection result of the steering angle sensor 37. The ECU 22B can obtain the detection result of a sensor 36 that detects whether the driver is gripping the steering wheel ST, and can monitor the steering wheel gripping state of the driver.

The ECU 23B is a braking control unit configured to control a hydraulic device 42B. The hydraulic device 42B implements, for example, VSA (Vehicle Stability Assist). A braking operation of the driver on the brake pedal BP is converted into a fluid pressure by the brake master cylinder BM and transmitted to the hydraulic device 42B. The hydraulic device 42B is an actuator capable of controlling, based on the fluid pressure transmitted from the brake master cylinder BM, the fluid pressure of hydraulic oil to be supplied to the brake device 51 of each wheel. The ECU 23B performs driving control of a solenoid valve and the like provided in the hydraulic device 42B.

In this embodiment, the wheel speed sensor 38 provided in each of the four wheels, a yaw rate sensor 33B, and a pressure sensor 35 configured to detect the pressure in the brake master cylinder BM are electrically connected to the ECU 23B and the hydraulic device 42B, and an ABS function, traction control, and the posture control function for the vehicle V are implemented based on the detection results of these sensors. For example, the ECU 23B adjusts the braking force of each wheel based on the detection result of the wheel speed sensor 38 provided in each of the four wheels, thereby suppressing the skid of each wheel. In addition, the ECU 23B adjusts the braking force of each wheel based on the rotation angular speed about the vertical axis of the vehicle V detected by the yaw rate sensor 33B, thereby suppressing an abrupt posture change of the vehicle V.

The ECU 23B also functions as an external alarm control unit configured to control an information output device 43B that alarms information outside the vehicle. In this embodiment, the information output device 43B is a brake lamp, and the ECU 23B can light the brake lamp at the time of braking or the like. This can increase the attention of a following vehicle to the vehicle V.

The ECU 24B is a stop maintaining control unit configured to control an electric parking brake device (for example, a drum brake) 52 provided in each rear wheel. The electric parking brake device 52 includes a mechanism that locks the rear wheel. The ECU 24B can control lock and unlock of the rear wheels by the electric parking brake devices 52.

The ECU 25B is an in-vehicle alarm control unit configured to control an information output device 44B that alarms information in the vehicle. In this embodiment, the information output device 44B includes a display device arranged on the instrument panel. The ECU 25B can cause the information output device 44B to output various kinds of information such as a vehicle speed and fuel consumption.

An input device 45B is arranged in the vehicle so as to be operable by the driver, and accepts input of an instruction or information from the driver.

<Communication Lines>

An example of communication lines of the vehicle control apparatus 1, which communicably connect the ECUs, will be described with reference to FIG. 3. The vehicle control apparatus 1 includes communication lines L1 to L7 of wired communication. The ECUs 20A to 27A and 29A of the control apparatus 1A are connected to the communication line L1. Note that the ECU 28A may also be connected to the communication line L1.

The ECUs 21B to 25B of the control apparatus 1B are connected to the communication line L2. The ECU 20A of the control apparatus 1A is also connected to the communication line L2. The communication line L3 (the first communication line) connects the ECU 20A and the ECU 21B. The communication line L4 connects the ECU 20A and the ECU 21A. The communication line L5 connects the ECU 20A, the ECU 21A, and the ECU 28A. The communication line L6 connects the ECU 29A and the ECU 21A. The communication line L7 connects the ECU 29A and the ECU 20A.

The protocols of the communication lines L1 to L7 may be identical or different, and may be changed in accordance with the communication environment such as a communication speed, a communication amount, and durability. For example, the communication lines L3 and L4 may be Ethernet® from the viewpoint of communication speed. For example, the communication lines L1, L2, and L5 to L7 may be CAN.

The control apparatus 1A includes a gateway GW. The gateway GW relays the communication line L1 and the communication line L2. For this reason, for example, the ECU 21B can output a control instruction to the ECU 27A via the communication line L2, the gateway GW, and the communication line L1.

<Power Supply>

The power supply of the vehicle control apparatus 1 will be described with reference to FIG. 3. The vehicle control apparatus 1 includes a large capacity battery 6, a power supply 7A, and a power supply 7B. The large capacity battery 6 is a battery used to drive the motor M and charged by the motor M.

The power supply 7A is a power supply that supplies power to the control apparatus 1A, and includes a power supply circuit 71A and a battery 72A. The power supply circuit 71A is a circuit that supplies the power of the large capacity battery 6 to the control apparatus 1A, and, for example, lowers the output voltage (for example, 190 V) of the large capacity battery 6 to a reference voltage (for example, 12 V). The battery 72A is a lead battery of, for example, 12 V. Since the battery 72A is provided, the power can be supplied to the control apparatus 1A even in a case in which the power supply of the large capacity battery 6 or the power supply circuit 71A is shut down or lowers.

The power supply 7B is a power supply that supplies power to the control apparatus 1B, and includes a power supply circuit 71B and a battery 72B. The power supply circuit 71B is a circuit that is similar to the power supply circuit 71A and supplies the power of the large capacity battery 6 to the control apparatus 1B. The battery 72B is a battery similar to the battery 72A, and is a lead battery of, for example, 12 V. Since the battery 72B is provided, the power can be supplied to the control apparatus 1B even in a case in which the power supply of the large capacity battery 6 or the power supply circuit 71B is shut down or lowers.

<Overall Arrangement>

The overall arrangement of the vehicle V will be described from another viewpoint with reference to FIG. 4. The vehicle V includes the control apparatus 1A (the first control apparatus), the control apparatus 1B (the second control apparatus), an external recognition device group 82, and an actuator group 83. In the vehicle control apparatus 1 according to this embodiment, the control apparatus 1A (the first control apparatus) and the control apparatus 1B (the second control apparatus) perform travel control of the vehicle V.

Figure 4:
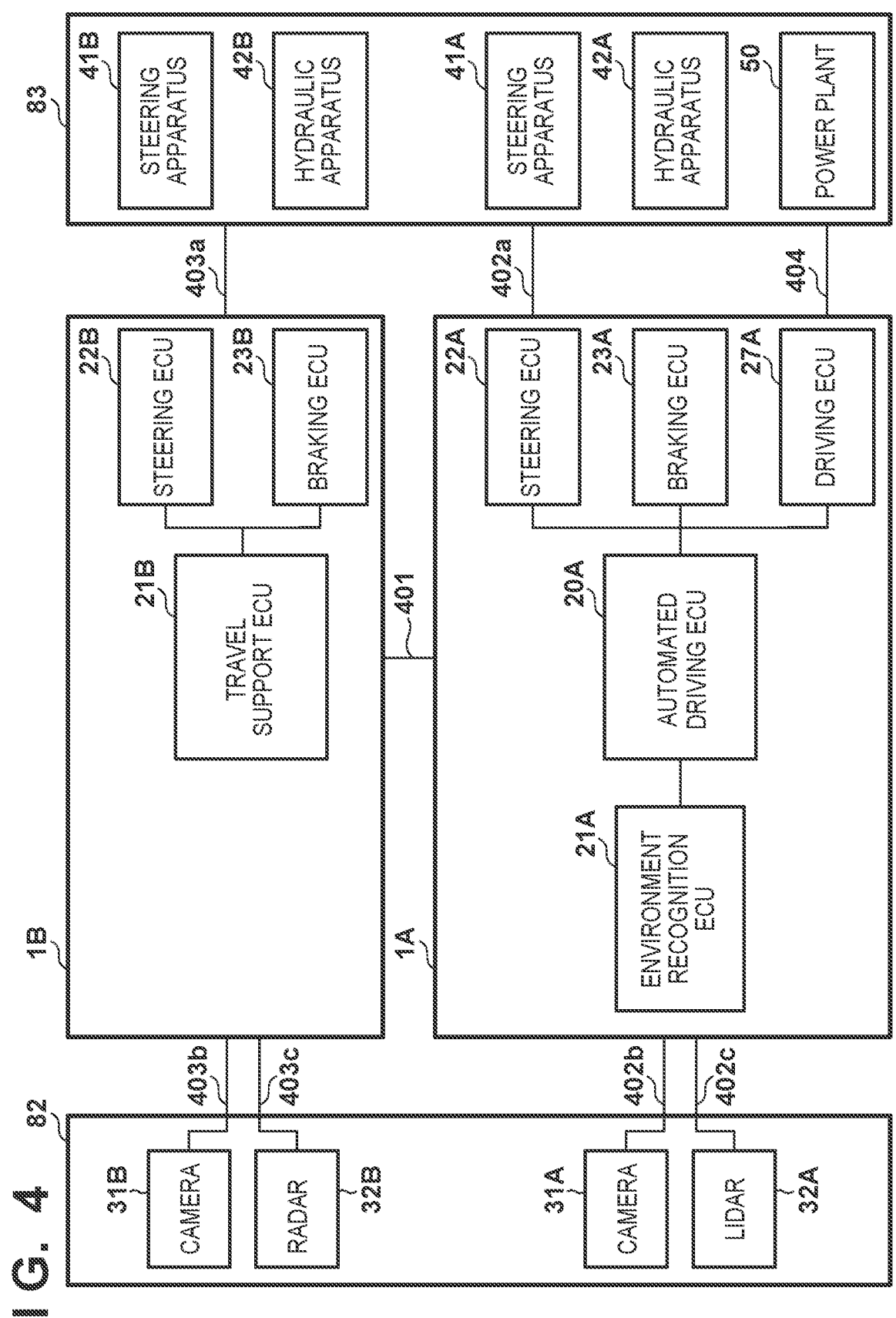
FIG. 4 is a block diagram of the vehicle control apparatus according to the embodiment.

As shown in FIG. 4, the control apparatus 1A (the first control apparatus) and the control apparatus 1B (the second control apparatus) are connected by a communication line 401 (the first communication line) and can communicate with each other. In this case, the communication line 401 corresponds to the communication line L3 of FIG. 3.

The actuator group 83 functions as an operation unit that operates based on a control signal transmitted from the control apparatus 1A (the first control apparatus) or the control apparatus 1B (the second control apparatus). The control apparatus 1A and the actuator group 83 (the operation unit) are connected by a communication line 402a (the second communication line), and the actuator group 83 (the operation unit) can be operated by a control signal transmitted from the control apparatus 1A (the first control apparatus). In addition, the control apparatus 1B (the second control apparatus) and the actuator group 83 (the operation unit) are connected by a communication line 403a (the third communication line), and the actuator group 83 (the operation unit) can be operated by a control signal transmitted from the control apparatus 1B (the second control apparatus).

Furthermore, the control apparatus 1A (the first control apparatus) and the actuator group 83 (the operation unit) are connected by a communication line 404 (the fourth communication line), and the control apparatus 1A (the first control apparatus) can transmit a driving takeover determination signal (to be described later) to the actuator group 83 (the operation unit) via the fourth communication line.

The external recognition device group 82 is a set of external recognition devices (sensors) mounted on the vehicle V. The external recognition device group 82 includes the above-described cameras 31A and 31B, LiDAR 32A, and radar 32B. The camera 31A and the LiDAR 32A are connected to the control apparatus 1A (the first control apparatus) via a communication line 402b and a communication line 402c. Pieces of external information obtained by the camera 31A and the LiDAR 32A and information concerning these devices are supplied to the control apparatus 1A, and the camera 31A and the LiDAR 32A operate in accordance with an instruction (control signal) from the control apparatus 1A.

The camera 31B and the radar 32B are connected to the control apparatus 1B (the second control apparatus) by a communication line 403b and a communication line 403c, respectively. Pieces of external information obtained by the camera 31B and the radar 32B and information concerning these devices are supplied to the control apparatus 1B, and the camera 31B and the radar 32B operate in accordance with an instruction (control signal) from the control apparatus 1B. The control apparatus 1B may supply the pieces of external information obtained by the camera 31B and the radar 32B to the control apparatus 1A via the communication line 401 (the first communication line). This enables the control apparatus 1A to execute automated driving control using the pieces of external information obtained from each of the cameras 31A and 31B, LiDAR 32A, and radar 32B.

The actuator group 83 (the operation unit) is a set of actuators mounted on the vehicle V. The actuator group 83 includes, for example, the electric power steering device 41A, the electric power steering device 41B, the hydraulic device 42A, the hydraulic device 42B, and the power plant 50 described above.

Pieces of information related to the electric power steering device 41A, the first hydraulic device 42A, and the power plant 50 are supplied to the control apparatus 1A (the first control apparatus) via the communication line 402a (second communication line), and the electric power steering device 41A, the first hydraulic device 42A, and the power plant 50 operate in accordance with an instruction (control signal) from the control apparatus 1A. In addition, pieces of information related to the electric power steering device 41B and the second hydraulic device 42B are supplied to the control apparatus 1B (the second control apparatus) via the communication line 403a (the third communication line), and the electric power steering device 41B and the second hydraulic device 42B operate in accordance with an instruction (control signal) from the control apparatus 1B.

The power plant 50 drives the vehicle V, and is thus a kind of longitudinal control actuator. Furthermore, the power plant 50 can change the direction of the vehicle V by changing the distribution of the driving forces of the left and right wheels, and is thus a kind of lateral control actuator. Each of the hydraulic devices 42A and 42B performs braking of the vehicle V, and is thus a kind of longitudinal control actuator. Furthermore, each of the hydraulic devices 42A and 42B can change the direction of the vehicle V by brake torque vectoring, and is thus a kind of lateral control actuator. Each of the electric power steering devices 41A and 41B controls steering of the vehicle V, and is thus a kind of lateral control actuator.

The control apparatus 1A (the first control apparatus) can communicate with some of the devices (for example, the electric power steering device 41A, the first hydraulic device 42A, and the power plant 50) of the actuator group 83 via the communication line 402a (the second communication line). Also, the control apparatus 1B (the second control apparatus) can communicate with some of the devices (for example, the electric power steering device 41B and the second hydraulic device 42B) of the actuator group 83 via the communication line 403a (the third communication line). The communication line 401 to a communication line 404 are, for example, a CAN (Controller Area Network) but may also be Ethernet®. Alternatively, both the CAN and Ethernet® may be used to connect the devices.

<Processing>

Figure 5:
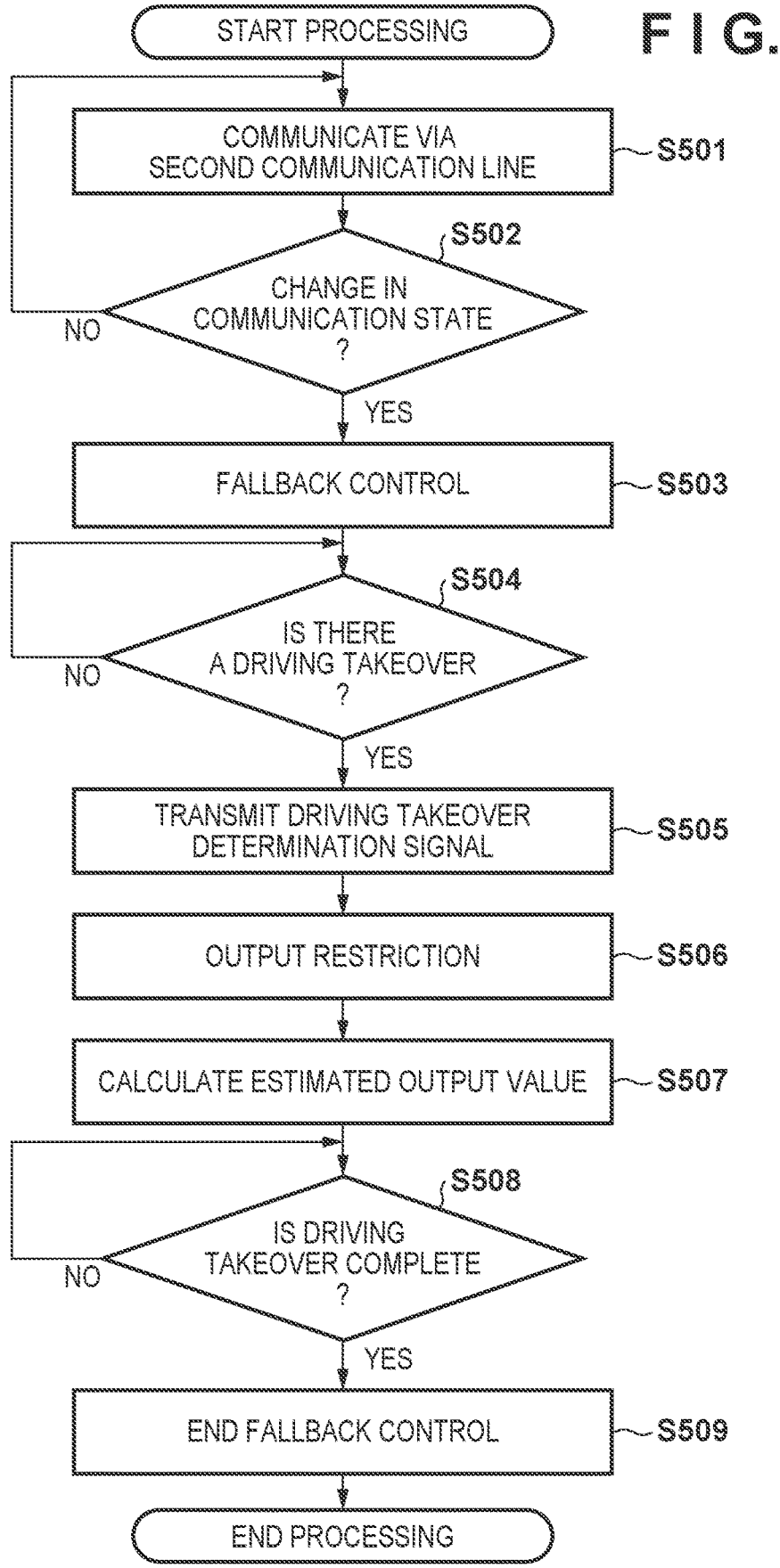
FIG. 5 is a flowchart for explaining the procedure of processing of the vehicle control apparatus according to the embodiment.

The processing of the control apparatus 1A in the vehicle control apparatus 1 will be described next. FIG. 5 is a flowchart for explaining the procedure of processing of the vehicle control apparatus 1. FIG. 6 is a timing chart for explaining the processing of the vehicle control apparatus 1.

In step S501, the control apparatus 1A obtains information by communicating with the external recognition device group 82 and the actuator group 83 (the operation unit) via the communication line 402a, the communication line 402b, and the communication line 402c, and the control apparatus 1A controls the external recognition device group 82 and the actuator group 83 based on the obtained information.

As shown in FIG. 6, the vehicle V is in an automated driving control state based on a control signal 601 of the control apparatus 1A, and an actuator (for example, the power plant 50) forming the actuator group 83 outputs a control output value 602 in accordance with the control signal 601 of the control apparatus 1A. In this state, an output value 603 (for example, an output value of the power plant 50 with respect to the stepping of the accelerator pedal AP) based on the operation of the driver is zero. Also, in the automated driving control state, the driver is in a state (OFF state) in which the driver is not performing a first driving operation (for example, gripping of the steering wheel) and a second driving operation (for example, steering of the steering wheel).

In step S502, the control apparatus 1A determines whether the communication state of the communication line 402a (the second communication line) has changed. For example, if information cannot be obtained from the actuator group 83 at a predetermined timing due to the influence from an electrical contact failure, noise, or the like or if an operation state change notification signal is transmitted from the actuator group 83, the control apparatus 1A will determine that the communication state of the communication line 402a (the second communication line) has changed (YES in step S502) and advance the process to step S503.

On the other hand, if it is determined that the communication state of the communication line 402a (the second communication line) has not changed in step S502 (NO in step S502), the process will return to step S501, and similar processing will be repeatedly performed. The control apparatus 1A will communicate with the external recognition device group 82 and the actuator group 83 (the operation unit) via the communication line 402a (the second communication line), and the control apparatus 1A will control the external recognition device group 82 and the actuator group 83 based on the obtained information.

In step S503, the control apparatus 1A starts (TM1 of FIG. 6) control (fallback control) that restricts the travel control function of the vehicle. If information related to some of the actuators of the actuator group 83 including a plurality of actuators cannot be obtained due to a change in the communication state of the communication line 402a (the second communication line), the control apparatus 1A will perform fallback control that restricts the control function of one (for example, the lateral control or the longitudinal control) of the longitudinal control and the lateral control provided by the actuator group 83 (operation unit).

The control output value 602 of an actuator (for example, the power plant 50) becomes zero at the timing (TM1 of FIG. 6) when the fallback control is started. In a period (output suppression period) from the start (TM1 of FIG. 6) of the fallback control to the confirmation (TM3 of FIG. 6) of driving takeover, an output value 604 based on the operation by the driver will be maintained at zero even if the driver inputs an operation at timing TM2. When the fallback control is started in this step, the control apparatus 1A will continue executing the fallback control even when the communication state of the communication line 402a (the second communication line) has recovered while the fallback control is being executed.

In step S504, the control apparatus 1A determines whether driving takeover by the driver has been performed. In a case in which the driving takeover by the driver that corresponds to the change in the communication state of the communication line 402a (the second communication line) has been detected by the detection units, the control apparatus 1A will transmit, in a step to be later described, a determination signal (driving takeover determination signal) indicating the driving takeover determination result to the actuator group 83 (the operation unit) via the communication line 404 (the fourth communication line). In this case, the condition for determining the driving takeover by the driver is based on a state in which the driver is performing a plurality of driving operations (double action state).

If a plurality of driving operations by the driver are not detected in the determination of step S504 (NO in step S504), the control apparatus 1A will determine to stand by in a detection standby state for the plurality of driving operations. Since a state in which the driving takeover by the driver is unconfirmed will be set in a detection standby state for the plurality of driving operations, that is, in a state before the transmission of the driving takeover determination signal, the control apparatus 1A will suppress the output from the actuator group 83 (the operation unit) corresponding to a single driving operation performed by the driver. For example, even if the driver has operated the accelerator pedal AP, the output value 604 will be suppressed to zero as shown in FIG. 6. As a result, it will be possible to suppress the vehicle behavior from destabilizing in response to the driver performing a driving operation in a state in which the driving takeover is unconfirmed.

On the other hand, if a plurality of driving operations by the driver are detected in the determination of step S504, that is, if a detection result from a sensor (first detection unit) that detects a first driving operation (for example, gripping of the steering wheel) by the driver and a detection result from a sensor (second detection unit) that detects a second driving operation (for example, steering of the steering wheel) by the driver are input to the control apparatus 1A, the control apparatus 1A will determine that driving takeover has been detected (YES in step S504) and advance the process to step S505.

In step S505, the control apparatus 1A transmits (TM3 of FIG. 6) the driving takeover determination signal indicating the driving takeover determination result to the actuator group 83 (the operation unit) via the communication line 404 (the fourth communication line). The driving takeover is confirmed at the timing of TM3.

In this step, the control apparatus 1A holds (latches onto) the detection result of the driving operation which indicates the gripping of the steering wheel. This detection result of the first driving operation will be held even if the driver has stopped gripping the steering wheel after the first driving operation has been detected. As a result, acceleration restriction can be avoided even if the driver makes an input on the accelerator pedal AP without gripping the steering wheel after the fallback control has been ended. Also, if the communication state of the second communication line has recovered, the control apparatus 1A will cancel the holding (latching) of the detection result of the first driving operation.

By receiving the driving takeover determination signal, the actuator group 83 (the operation unit) will be able to recognize that the control apparatus A1 has switched from automated driving to an operation based on the driving operation by the driver. The actuator group 83 (the operation unit) will operate based on an instruction value which is based on the driving operation performed by the driver.

In step S506, after the transmission of the driving takeover determination signal, the control apparatus 1A restricts the upper limit of the output value of the actuator group 83 (for example, the power plant 50) that corresponds to a third driving operation (for example, the operation on the accelerator pedal AP) by the driver. As a result, it will be possible to suppress a rapid change in the output value which is output from the actuator group 83 in correspondence with the third driving operation by the driver.

As an output value restriction pattern, the control apparatus 1A will perform control, as shown in FIG. 6, so that the output value 604 of each actuator forming the actuator group 83 will change (increase) linearly in a period (rate limit period) from the confirmation of driving takeover at timing TM3 to the completion of the fallback control at timing TM4. By performing control so that the output value will change linearly, the switch from automated driving to the operation based on the driving operation by the driver performed by the control apparatus 1A can be executed smoothly.

In step S507, the control apparatus 1A calculates an estimated output value (for example, an estimated output value 605 of FIG. 6) of the actuator group 83 (for example, the power plant 50) corresponding to the third driving operation (for example, an operation on the accelerator pedal AP) by the driver. Although the output value 604 to be actually output from the actuator group 83 has been restricted by the process of step S506, an output value estimated for a case in which the output value is not restricted will be calculated as the estimated output value in this step.

In step S508, the control apparatus 1A determines whether the driving takeover has been completed based on a comparison result obtained by comparing the estimated output value (step S507) and the output value (the output valued which increased linearly (step S506)) which has undergone the output restriction. If the estimated output value 605 and the output value 604 which has increased linearly are not equal (NO in step S508), the control apparatus 1A will continue performing the determination processing based on the comparison result. On the other hand, if the estimated output value 605 of the actuator group 83 corresponding to the third driving operation by the driver is equal to the output value 604 which has increased linearly (YES in step S508), the control apparatus 1A will determine that the driving takeover has been completed and advance the process to step S509.

In step S509, the control apparatus 1A ends the fallback control (TM4 of FIG. 6). Subsequently, the vehicle control state shifts to manual driving by the driver (shift to manual driving).

The control apparatus 1A ends the fallback control if completion of the driving takeover is determined based on the control state of the vehicle during the fallback control. The control apparatus 1A will determine that the driving takeover has been completed and end the fallback control in a case in which it can be determined that, as the control state of the vehicle V during fallback control, the estimated output value 605 of the actuator group 83 (the operation unit) corresponding to the third operation by the driver has become equal to the output value 604 which has increased linearly. As a result, it will be possible to perform the fallback control without switching the main subject of travel control of the vehicle, and the control of the vehicle can be shifted smoothly from fallback control to manual driving.

<Case in which Control Apparatus 1B Performs Fallback Control>

FIG. 7 is a flowchart showing the procedure of processing until the control apparatus 1B starts performing the fallback control. The same step numbers denote processes which are similar to those of the flowchart of FIG. 5.

In step S501, the control apparatus 1A obtains information by communicating with the external recognition device group 82 and the actuator group 83 (the operation unit) via the communication line 402a, the communication line 402b, and the communication line 402c, and the control apparatus 1A controls the external recognition device group 82 and the actuator group 83 based on the obtained information.

In step S502, the control apparatus 1A determines whether the communication state of the communication line 402a (the second communication line) has changed. For example, if information cannot be obtained from the actuator group 83 at a predetermined timing due to the influence from an electrical contact failure, noise, or the like or if an operation state change notification signal is transmitted from the actuator group 83, the control apparatus 1A will determine that the communication state of the communication line 402a (the second communication line) has changed (YES in step S502) and advance the process to step S703.

On the other hand, if it is determined that the communication state of the communication line 402a (the second communication line) has not changed in step S502 (NO in step S502), the process will return to step S501, and similar processing will be repeatedly performed.

In step S703, before executing the fallback control, the control apparatus 1A performs communication via the communication line 404 (the fourth communication line) in advance to determine whether the communication line 404 (the fourth communication line) is in a communicable state. For example, if a predetermined signal can be received due to disconnection or contact failure of the communication line 404 (the fourth communication line) (YES in step S704), the process will advance to step S706.

In step S706, the control apparatus 1A executes the fallback control. In this case, the control apparatus 1A will execute the processes of step S503 and subsequent steps described in FIG. 5.

On the other hand, if it is determined that the communication line 404 (the fourth communication line) is not in a communicable state (NO in step S704), the process will advance to step S705.

Subsequently, in step S705, the control apparatus 1B executes the fallback control. In a case in which the communication state of the communication line 402a (the second communication line) has changed and the communication line 404 (the fourth communication line) is not in a communicable state, the control apparatus 1A will transmit a fallback control instruction signal to the control apparatus 1B via the communication line 401 (the first communication line), and the control apparatus 1B will perform the fallback control via the communication line 403a (the third communication line). According to the processing of FIG. 7, the control apparatus 1B can perform the fallback control via the communication line 403a (the third communication line) in a case in which the communication line 404 (the fourth communication line is not in a communicable state.

Other Embodiments

A vehicle control program that implements one or more functions described in the embodiments is supplied to a system or an apparatus via a network or a storage medium, and one or more processors in the computer of the system or the apparatus can load the program and execute it. The present invention can also be implemented by such a mode.

<Summary of Embodiment>

Arrangement 1. A vehicle control apparatus (for example, 1 of FIG. 1) according to the above-described embodiment is a vehicle control apparatus that comprises a first control unit (for example, 1A of FIG. 4) and a second control unit (for example, 1B of FIG. 4) each configured to perform travel control of a vehicle, a first communication line (for example, 401 of FIG. 4) configured to connect the first control unit (1A) and the second control unit (1B), a second communication line (for example, 402a of FIG. 4) configured to connect the first control unit (1A) and an operation unit (for example, 83 of FIG. 4) configured to operate based on a control signal transmitted from one of the first control unit (1A) and the second control unit (1B), and a third communication line (for example, 403a of FIG. 4) configured to connect the operation unit (83) and the second control unit (1B), wherein the vehicle control apparatus (1) further comprises a fourth communication line (for example, 404 of FIG. 4) configured to connect the first control unit (1A) and the operation unit (83), and wherein in a case in which a communication state of the second communication line has changed, the first control unit (1A) performs fallback control to restrict a travel control function of the vehicle, in a case in which a detection unit detects driving takeover by a driver corresponding to the change in the communication state, the first control unit (1A) transmits a determination signal indicating a determination result of the driving takeover to the operation unit via the fourth communication line, and in a case in which completion of the driving takeover is determined based on a control state of the vehicle in the fallback control, the first control unit (1A) ends the fallback control. Note that fallback control may also be referred to as alternative control.

According to the vehicle control apparatus of Arrangement 1, fallback control can be performed without switching the main subject of travel control of the vehicle.

Arrangement 2. In the vehicle control apparatus (1) according to the above-described embodiment, in a state before the transmission of the determination signal, the first control unit (1A) suppresses an output from the operation unit (83) corresponding to a single driving operation by the driver.

According to the vehicle control apparatus of Arrangement 2, it is possible to suppress vehicle behavior from destabilizing in response to a driving operation performed by the driver in a state in which the driving takeover is unconfirmed.

Arrangement 3. In the vehicle control apparatus (1) according to the above-described embodiment, in a case in which a detection result from a first detection unit configured to detect a first driving operation by the driver and a detection result from a second detection unit configured to detect a second driving operation by the driver are input, the first control unit (1A) determines that the driving takeover has been detected and transmits the determination signal.

According to the vehicle control apparatus of Arrangement 3, the operation intention of the driver can be determined based on the detection results of a plurality of driving operations, and the operation intention of the driver can be reflected on the fallback control.

Arrangement 4. In the vehicle control apparatus (1) according to the above-described embodiment, after the transmission of the determination signal, the first control unit (1A) restricts the upper limit of an output value of the operation unit corresponding to a third driving operation by the driver.

Arrangement 5. In the vehicle control apparatus (1) according to the above-described embodiment, the first control unit (1A) performs control so that the output value of the operation unit (83) will increase linearly.

According to the vehicle control apparatus of Arrangement 4 and Arrangement 5, it is possible to suppress a rapid change in an output value which is output from the actuator group in correspondence with the third driving operation by the driver.

Arrangement 6. In the vehicle control apparatus (1) according to the above-described embodiment, in a case in which it is determined that, as the control state of the vehicle in the fallback control, an estimated output value (for example, 605 of FIG. 6) of the operation unit (83) corresponding to the third driving operation by the driver has become equal to the output value (for example, 604 of FIG. 6) which has increased linearly, the first control unit (1A) determines that the driving takeover has been completed and ends the fallback control.

According to the vehicle control apparatus of Arrangement 6, fallback control can be performed without switching the main subject of travel control of the vehicle, and the control of the vehicle can be shifted smoothly from fallback control to manual driving.

Arrangement 7. In the vehicle control apparatus (1) according to the above-described embodiment, the first control unit (1A) holds the detection result of the first driving operation.

Arrangement 8. In the vehicle control apparatus (1) according to the above-described embodiment, in a case in which the communication state of the second communication line (402a) has recovered, the first control unit (1A) cancels the holding of the detection result of the first driving operation.

According to the vehicle control apparatus of Arrangement 7 and Arrangement 8, acceleration restriction can be avoided in a case in which the driver makes an input on the accelerator pedal AP without gripping the steering wheel after the fallback control has been ended.

Arrangement 9. In the vehicle control apparatus (1) according to the above-described embodiment, even in a case in which the communication state of the second communication line (402a) has recovered during the execution of the fallback control, the fallback control will be continued by the first control unit (1A).

Arrangement 10. In the vehicle control apparatus (1) according to the above-described embodiment, in a case in which a communication state of the second communication line (402a) has changed and the fourth communication line (404) is not in a communicable state, the first control unit (1A) transmits a fallback control instruction signal to the second control unit (1B) via the first communication line (401), and
the second control unit (1B) performs the fallback control via the third communication line.

According to the vehicle control apparatus of Arrangement 10, in a case in which the fourth communication line (404) is not in a communicable state, the second control unit (1B) can perform fallback control via the third communication line.

Arrangement 11. A vehicle (for example, V of FIG. 1) according to the above-described embodiment is a vehicle comprising a vehicle control apparatus (1) defined in any one of Arrangement 1 to Arrangement 10.

According to the vehicle of Arrangement 11, a vehicle that includes a vehicle control apparatus that can perform fallback control without switching the main subject of travel control of the vehicle can be provided.

Arrangement 12. A vehicle control method of a vehicle control apparatus (for example, 1 of FIG. 1) according to the above-described embodiment is a vehicle control method of a vehicle control apparatus (1) that comprises
a first control unit (for example, 1A of FIG. 4) and a second control unit (for example, 1B of FIG. 4) each configured to perform travel control of a vehicle,
a first communication line (for example, 401 of FIG. 4) configured to connect the first control unit (1A) and the second control unit (1B),
a second communication line (for example, 402a of FIG. 4) configured to connect the first control unit (1A) and an operation unit (for example, 83 of FIG. 4) configured to operate based on a control signal transmitted from one of the first control unit (1A) and the second control unit (1B), and
a third communication line (for example, 403a of FIG. 4) configured to connect the operation unit (83) and the second control unit (1B),
wherein the vehicle control apparatus (1) further comprises a fourth communication line (for example, 404 of FIG. 4) configured to connect the first control unit (1A) and the operation unit (83), and
wherein the vehicle control method to be executed by the first control unit (1A) comprises
performing (for example, S503 of FIG. 5), in a case in which a communication state of the second communication line has changed, fallback control to restrict a travel control function of the vehicle,
transmitting (for example, S505 of FIG. 5), in a case in which a detection unit detects driving takeover by a driver corresponding to the change in the communication state (for example, YES in S504 of FIG. 5), a determination signal indicating a determination result of the driving takeover to the operation unit (83) via the fourth communication line, and
ending (for example, S509 of FIG. 5) the fallback control in a case in which completion of the driving takeover is determined (for example, YES in S508 of FIG. 5) based on a control state (for example, S505, S506 of FIG. 5) of the vehicle in the fallback control.

According to the vehicle control method of the vehicle control apparatus of Arrangement 12, fallback control can be performed without switching the main subject of travel control of the vehicle.

Arrangement 13. A non-transitory computer-readable storage medium storing a program pf Arrangement 13 is a storage medium storing a program for causing a computer to execute each step of the above-described vehicle control method.

According to the storage medium storing a program of Arrangement 13, a non-transitory computer-readable storage medium storing a program for causing a computer to execute each step of a vehicle control method that can perform fallback control without switching the main subject of travel control of the vehicle can be provided.

The invention is not limited to the foregoing embodiments, and various variations/changes are possible within the spirit of the invention.

What is claimed is:
1. A vehicle control apparatus that comprises:
a first control unit and a second control unit each comprising at least one processor circuit with a memory comprising instructions, that when executed by the processor circuit, causes the at least one processor circuit to at least perform travel control of a vehicle,
a first communication line configured to connect the first control unit and the second control unit,
a second communication line configured to connect the first control unit and an actuator group configured to operate based on a control signal transmitted from one of the first control unit and the second control unit, and
a third communication line configured to connect the actuator group and the second control unit,
wherein the vehicle control apparatus further comprises a fourth communication line configured to connect the first control unit and the actuator group, and
wherein in a communication state in which information cannot be obtained from the actuator group via the second communication line due to influence from an electrical contact failure or noise, the first control unit starts fallback control to suppress a travel control function of the vehicle,
in a case in which the fallback control is started, control output values of actuators included in the actuator group are suppressed in a period from a start of the fallback control to a confirmation of driving takeover,
in a case in which a plurality of detection sensors detect driving operations for driving takeover by a driver in the communication state, the first control unit transmits a determination signal indicating a determination result of the driving operations for the driving takeover to the actuator group via the fourth communication line,
wherein in a case in which a detection result from a first detection sensor which detects a first driving operation to a first actuator included in the actuator group and a detection result from a second detection sensor which detects a second driving operation to a second actuator included in the actuator group are input, the first control unit determines that the driving takeover has been detected and transmits the determination signal to the actuator group via the fourth communication line,
the first control unit restricts an output value to be actually output from a third actuator corresponding to a third driving operation by the driver in a fallback control period from the confirmation of driving takeover to a completion of the fallback control,
the first control unit calculates an estimated output value of the third actuator included in the actuator group in a case in which the output value is not restricted,
the first control unit determines whether the driving takeover has been completed based on a comparison result obtained by comparing the estimated output value and the output value which has undergone the output restriction,
in a case in which the estimated output value and the output value are not equal, the first control unit continues performing the determination processing based on the comparison result, and
in a case in which the estimated output value is equal to the restricted output value to be actually output from the third actuator in the fallback control period, the first control unit ends the fallback control and shifts the fallback control to manual driving.

2. The apparatus according to claim 1, wherein in a state before the transmission of the determination signal, the first control unit suppresses an output, from the actuator group, corresponding to a single driving operation by the driver.

3. The apparatus according to claim 1, wherein after the transmission of the determination signal, the first control unit restricts the upper limit of an output value of the actuator group corresponding to the third driving operation by the driver.

4. The apparatus according to claim 3, wherein the first control unit performs control so that the output value of the actuator group will increase linearly.

5. The apparatus according to claim 4, wherein in a case in which it is determined that, as the control state of the vehicle in the fallback control, the estimated output value of the actuator group corresponding to the third driving operation by the driver has become equal to the output value which has increased linearly, the first control unit determines that the driving takeover has been completed and ends the fallback control.

6. The apparatus according to claim 1, wherein the first control unit holds the detection result of the first driving operation.

7. The apparatus according to claim 6, wherein in a case in which the communication state of the second communication line has changed, the first control unit performs the fallback control, in a period from a start of the fallback control to a confirmation of the driving takeover, the first control unit suppresses an output from the actuator group corresponding to a single driving operation performed by the driver.

8. The apparatus according to claim 7, wherein in a case in which the communication state of the second communication line has changed, the fallback control will be continued by the first control unit in the period, an output value based on an operation by the driver is maintained at zero.

9. The apparatus according to claim 1, wherein in a case in which the communication state of the second communication line has changed and the fourth communication line is not in a communicable state, the first control unit transmits a fallback control instruction signal to the second control unit via the first communication line, and
the second control unit performs the fallback control via the third communication line.

10. A vehicle comprising a vehicle control apparatus defined in claim 1.

11. A vehicle control method of a vehicle control apparatus that comprises:
a first control unit and a second control unit each comprising at least one processor circuit with a memory comprising instructions, that when executed by the processor circuit, causes the at least one processor circuit to at least perform travel control of a vehicle,
a first communication line configured to connect the first control unit and the second control unit,
a second communication line configured to connect the first control unit and an actuator group configured to operate based on a control signal transmitted from one of the first control unit and the second control unit, and
a third communication line configured to connect the actuator group and the second control unit, the vehicle control apparatus further comprising a fourth communication line configured to connect the first control unit and the actuator group, and
wherein the vehicle control method to be executed by the first control unit comprises
starting, in a communication state in which information cannot be obtained from the actuator group via the second communication line due to influence from an electrical contact failure or noise, fallback control to suppress a travel control function of the vehicle,
suppressing, in a case in which the fallback control is started, control output values of actuators included in the actuator group in a period from a start of the fallback control to a confirmation of driving takeover, transmitting, in a case in which a plurality of detection sensors detect driving operations for driving takeover by a driver in the communication state, a determination signal indicating a determination result of the driving operations for the driving takeover to the actuator group via the fourth communication line, wherein in a case in which a detection result from a first detection sensor which detects a first driving operation to a first actuator included in the actuator group and a detection result from a second detection sensor which detects a second driving operation to a second actuator included in the actuator group are input, it is determined that the driving takeover has been detected and the determination signal is transmitted to the actuator group via the fourth communication line, restricting an output value to be actually output from a third actuator corresponding to a third driving operation by the driver in a fallback control period from the confirmation of driving takeover to a completion of the fallback control;

calculating an estimated output value of the third actuator included in the actuator group in a case in which the output value is not restricted;

determining whether the driving takeover has been completed based on a comparison result obtained by comparing the estimated output value and the output value which has undergone the output restriction, continuing, in a case in which the estimated output value and the output value are not equal, performing the determination processing based on the comparison result, ending, in a case in which the estimated output value is equal to the restricted output value to be actually output from the third actuator in the fallback control period, the fallback control; and shifting the fallback control to manual driving.

12. A non-transitory computer-readable storage medium storing a program for causing a computer to execute each step of a vehicle control method defined in claim 11.

* * * * *